United States Patent
Krug (10) Patent No.: US 11,017,652 B2
(45) Date of Patent: May 25, 2021

(54) SYSTEM FOR PUBLICATION AND ASSIGNMENT OF ASSISTANCE REQUESTS

(71) Applicant: Retreiver App LLC, West Hartford, CT (US)

(72) Inventor: Joshua Krug, West Hartford, CT (US)

(73) Assignee: Retreiver App LLC, West Harford, CT (US)

( * ) Notice: Subject to any disclaimer, the term of this patent is extended or adjusted under 35 U.S.C. 154(b) by 0 days.

(21) Appl. No.: 16/526,251

(22) Filed: Jul. 30, 2019

(65) Prior Publication Data
US 2021/0035433 A1    Feb. 4, 2021

(51) Int. Cl.
| | |
|---|---|
| *G08B 21/24* | (2006.01) |
| *G06F 16/951* | (2019.01) |
| *G06F 21/62* | (2013.01) |
| *H04W 12/12* | (2021.01) |
| *G06F 16/245* | (2019.01) |

(52) U.S. Cl.
CPC ......... *G08B 21/24* (2013.01); *G06F 16/245* (2019.01); *G06F 16/951* (2019.01); *G06F 21/6245* (2013.01); *H04W 12/12* (2013.01); *G06F 2221/2111* (2013.01)

(58) Field of Classification Search
None
See application file for complete search history.

(56) References Cited

U.S. PATENT DOCUMENTS

| | | | | |
|---|---|---|---|---|
| 7,627,309 | B2 * | 12/2009 | Nitta | G06Q 10/10 |
| | | | | 455/414.2 |
| 10,251,128 | B2 * | 4/2019 | Nguyen | H04W 4/90 |
| 10,492,033 | B1 * | 11/2019 | Kim | H04W 4/029 |
| 2001/0013034 | A1 * | 8/2001 | Yamauchi | G06F 16/95 |
| 2002/0094787 | A1 * | 7/2002 | Avnet | H04L 67/18 |
| | | | | 455/68 |
| 2002/0095334 | A1 * | 7/2002 | Kao | G06Q 30/02 |
| | | | | 705/14.61 |
| 2005/0093986 | A1 * | 5/2005 | Shinohara | H04N 1/00167 |
| | | | | 348/208.1 |
| 2006/0055538 | A1 * | 3/2006 | Ritter | G06Q 20/32 |
| | | | | 340/572.1 |
| 2008/0035722 | A1 * | 2/2008 | Feld | G06Q 10/00 |
| | | | | 235/375 |
| 2010/0248681 | A1 * | 9/2010 | Phills | H04L 67/04 |
| | | | | 455/404.2 |
| 2012/0246313 | A1 * | 9/2012 | Ho | H04L 67/12 |
| | | | | 709/225 |

(Continued)

*Primary Examiner* — Curtis J King
(74) *Attorney, Agent, or Firm* — Welsh IP Law LLC (57) ABSTRACT

A system for assignment and publication of missing item data is provided. The system comprises a server, a poster computer for inputting missing item data, at least one retriever computer for inputting retriever identity data, an alert module on the server for generating an alert in response to the missing item data and sending the alert to the at least one retriever computer; an interface on the server for receiving an affirmative response to the alert that is associated with the retriever identity data from the at least one retriever computer, and a confirmation module on the server for confirming an assignment of finding an item according to the missing item data upon receiving the affirmative response and associating the missing item data with the retriever identity data.

17 Claims, 4 Drawing Sheets

(56) References Cited

U.S. PATENT DOCUMENTS

| | | | | |
|---|---|---|---|---|
| 2014/0162602 A1* | 6/2014 | Bombolowsky | ...... | H04W 12/12 455/411 |
| 2014/0281857 A1* | 9/2014 | Colodny | ............... | G06F 40/134 715/205 |
| 2014/0327518 A1* | 11/2014 | Loutit | .................... | G05B 19/00 340/7.58 |
| 2014/0329460 A1* | 11/2014 | Loutit | .................. | H04W 4/025 455/39 |
| 2015/0113404 A1* | 4/2015 | Agnoli | ................. | G11B 27/031 715/719 |
| 2016/0307433 A1* | 10/2016 | Hanggi | ................ | G08B 21/023 |
| 2017/0171333 A1* | 6/2017 | Liu | ...................... | H04L 67/306 |
| 2017/0228829 A1* | 8/2017 | Alhalabi | .............. | G06Q 20/102 |
| 2017/0262540 A1* | 9/2017 | Anhalt | ................ | G06Q 50/182 |
| 2018/0227393 A1* | 8/2018 | Daub | ....................... | H04L 67/20 |
| 2020/0015040 A1* | 1/2020 | Baird | .................... | H04W 64/00 |

\* cited by examiner

SYSTEM FOR PUBLICATION AND ASSIGNMENT OF ASSISTANCE REQUESTS

TECHNICAL FIELD

The present teachings relate generally to the assistance requests service, and more particularly to a network-based system that connects people who have a need for assistance of finding items with people who are interested in providing such assistance.

BACKGROUND

Traditionally, a lost flyer is a flyer created by the owner who has lost property (e.g. wallet, pet) and posted in the neighborhoods, for example, by being stapled to a telephone pole, to let a passerby know the missing property and to request help in finding the missing items. This traditional method is a passive way to disseminate the information to the right people in that the passerby may not pay attention to a lost flyer on a telephone pole or may not be interested in helping the poster find things. Also, the lost flyer may be placed in wrong neighborhoods, or the area for possible finding may be too large that effectively posting the lost flyer in the whole area is impossible. The above problems also apply to a lost flyer posted on social media.

On the other hand, people who are interested in making money by finding missing items for others may have difficulty to find such jobs, and people who have found things may have difficulty to find the owner. Therefore, it would be beneficial to have an alternative system and method for publication and assignment of assistance requests.

SUMMARY

The needs set for the herein as well as further and other needs and advantages are addressed by the present teachings, which illustrate solutions and advantages described below.

A system for assignment and publication of missing item data may comprise a server; a poster computer associated with a poster, the poster being an individual seeking a missing item; a first secure connection over the Internet between the server and the poster computer, the first secure connection requiring authentication of the poster; a plurality of retriever computers, each retriever computer associated with a retriever, the retriever being an individual interested in finding items; a plurality of second secure connections over the Internet, one between each retriever computer and the server, each second secure connection requiring authentication of the associated retriever; a data store accessible by the server; the data store having a missing item database having a plurality of records each having missing item data associated therewith; the data store having a retriever database having a plurality of records each having retriever identity associated therewith; an interface on the server for receiving missing item data from the poster computer via the first secure connection; an alert module on the server for generating an alert in response to the missing item data and sending the alert to a plurality of the retriever computers via the second secure connection; the interface on the server for receiving an affirmative response to the alert from at least one of a plurality of the retriever computers via the second secure connection, the affirmative response associated with retriever identity of a retriever who gave the affirmative response through the at least one of a plurality of the retriever computers; a confirmation module on the server for confirming an assignment of the missing item upon receiving the affirmative response and associating the missing item data of the assignment with the retriever identity; and a notice module on the server for generating a notice based on the missing item data and sending the notice to the at least one of a plurality of the retriever computers that affirmatively responded to the alert via the second secure connection.

The alert includes limited information of the missing item based on the missing item data, and the notice includes full information of the missing item based on the missing item data.

A system for assignment and publication of missing item data may further comprise a status module for generating a status update upon receiving status information from a retriever via the interface and sending the status update to the poster computer.

The status update includes contract information of the retriever.

A system for assignment and publication of missing item data may further comprise a report module for generating a report regarding the confirmed assignment and the retriever information and for sending the report to the poster computer.

The retriever information includes the retriever identity, at least one location, or performance history.

A system for assignment and publication of missing item data may further comprise a proximation module for determining whether a location of a retriever is proximate to a location provided in the missing item data.

The location of the retriever includes a location of the retriever computer, a location of the retriever's address, or a location interested by the retriever, and the location provided in the missing item data includes a location of the missing item last seen, or a location of the missing item possibly gone missing.

Determining whether a location of a retriever is proximate to a location provided in the missing item data is based on zip codes, town or city names, or distance between Global Positioning System (GPS) locations.

A system for assignment and publication of missing item data may further comprise a matching module for comparing found item data received from a retriever computer via the interface with missing item data and determining whether there is a match between the found item data and the missing item data.

A system for assignment and publication of missing item data may further comprise a found notice module for generating a found notice based on the match between the found item data and the missing item data and sending the found notice to the poster computer.

A triggering condition for sending the alert is set by the retriever.

Sending the alert to a retriever computer is triggered when the proximation module determines that a location of the retriever is proximate to a location provided in the missing item data, wherein the location of the retriever computer includes a location of the retriever computer, a location of the retriever's address, or a location interested by the retriever, and wherein the location provided in the missing item data includes a location of the missing item last seen, or a location of the missing item possibly gone missing.

A system for assignment and publication of missing item data may further comprise a form module for generating a missing item form that can be filled in by the poster to provide the missing item data, generating a retriever enrollment form that can be filled in by the retriever to provide the retriever identity or related information, and sending the forms to corresponding poster or retriever computers.

The missing item data includes a description of the missing item, a location of the missing item last seen, at least one location of the missing item possibly gone missing, a reward for exchanging the missing item, a requirement for receiving the reward, a delivering method, a payment method, who pays for a delivering cost, whether the reward includes the delivering cost, or at least one picture.

The retriever identify includes identification information, address, phone number, performance history, review, or social credit information.

A system for assignment and publication of missing item data may comprise a server; a poster computer for inputting missing item data; at least one retriever computer for inputting retriever identity data; a data store accessible by the server; the data store having a missing item database having a plurality of records each having missing item data associated therewith; the data store having a retriever database having a plurality of records each having retriever identity data associated therewith; an interface on the server for receiving the missing item data from the poster computer; an alert module on the server for generating an alert in response to the missing item data and sending the alert to the at least one retriever computer; the interface on the server for receiving an affirmative response to the alert from the at least one retriever computer, the affirmative response being associated with the retriever identity data; and a confirmation module on the server verifying retriever identity based on the retriever identity data associated with the affirmative response and associating the missing item data with the retriever identity data.

A system for assignment and publication of missing item data may further comprise a notice module on the server for generating a notice based on the missing item data and sending the notice to the at least one retriever computer.

The alert includes limited information of the missing item based on the missing item data, and the notice includes full information of the missing item based on the missing item data.

A non-transient computer readable medium containing software executed by at least one processor causes a central computer to perform the following steps: storing a missing item database having a plurality of records each having missing item data associated therewith; storing a retriever database having a plurality of records each having retriever identity associated therewith; receiving missing item data from a poster computer via a first secure connection; generating an alert in response to the missing item data and sending the alert to a plurality of retriever computers via a second secure connection; receiving an affirmative response to the alert from at least one of a plurality of the retriever computers via the second secure connection, the affirmative response associated with retriever identity; confirming an assignment upon receiving the affirmative response; associating the missing item data of the assignment with the retriever identity; and generating a notice based on the missing item data and sending the notice to the at least one of a plurality of the retriever computers that affirmatively responded to the alert via the second secure connection.

Other teachings of the system and method are described in detail below and are also part of the present teachings.

For a better understanding of the present teachings, together with other and further aspects thereof, reference is made to the accompanying drawings and detailed description, and its scope will be pointed out in the appended claims.

DETAILED DESCRIPTION

The present teachings are described more fully hereinafter with reference to the accompanying drawings. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first', 'second,' etc. for different features/components of the present disclosure are only intended to distinguish the features/components from other similar features/components and not to impart any order or hierarchy to the features/components.

In the present teachings, a person who is interested in finding items is referred to as a retriever, and a person who looks for or requests assistance (e.g., who has lost property) is referred to as a poster. The present teachings may be facilitated by the retriever or the poster using the same system, which may be cloud- or Internet-based. The system according to the present teachings contains functionality of a virtual, interactive, incentivized lost flyer. The system according to the present teachings provides an active method to alert retrievers who are waiting to earn money.

The retriever or the poster may use an electronic device to communicate with the platform and use the functions of the platform. An electronic device according to the present teaching may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. The platform may include hardware, such as a computer or a server, or components thereof. The platform may provide environment in which a piece of software is executed, such as a web page, an application, or a remote desktop.

The system may have a message module for generating a message, such as an alert, a report, a notice, or a status update, although not limited thereto. Alternatively, the message module may include an alert module, a report module, a notice module, and a status module, although not limited thereto, and each of these modules may generate a certain type of message, such as an alert, a report, a notice, or a status update, although not limited thereto. The system may include a form module for generating a missing item form that can be filled in by the poster to provide the missing item data, for generating a retriever enrollment form that can be filled in by the retriever to provide the retriever identity or related information, and for sending the forms to corresponding poster or retriever computers.

The system may have a data store (or database(s)) for saving data. The data store may be local, cloud-based, or Internet-based. The system may have a confirmation module for confirming the assignment of finding an item according to the missing item data when receiving an affirmative response from a retriever computer and associating the missing item data with a retriever's identity that is provided with or associated with the affirmative response of the retriever. The system may have a proximation module for determining the proximation of the locations. The system may have a matching module for comparing the found item data with missing item data and determining whether there is a match between the found item and the missing item. The system may have a found notice module for generating a found notice based on a match between a found item and a missing item and sending the found notice to the poster associated with the missing item through the poster computer.

Figure 1:
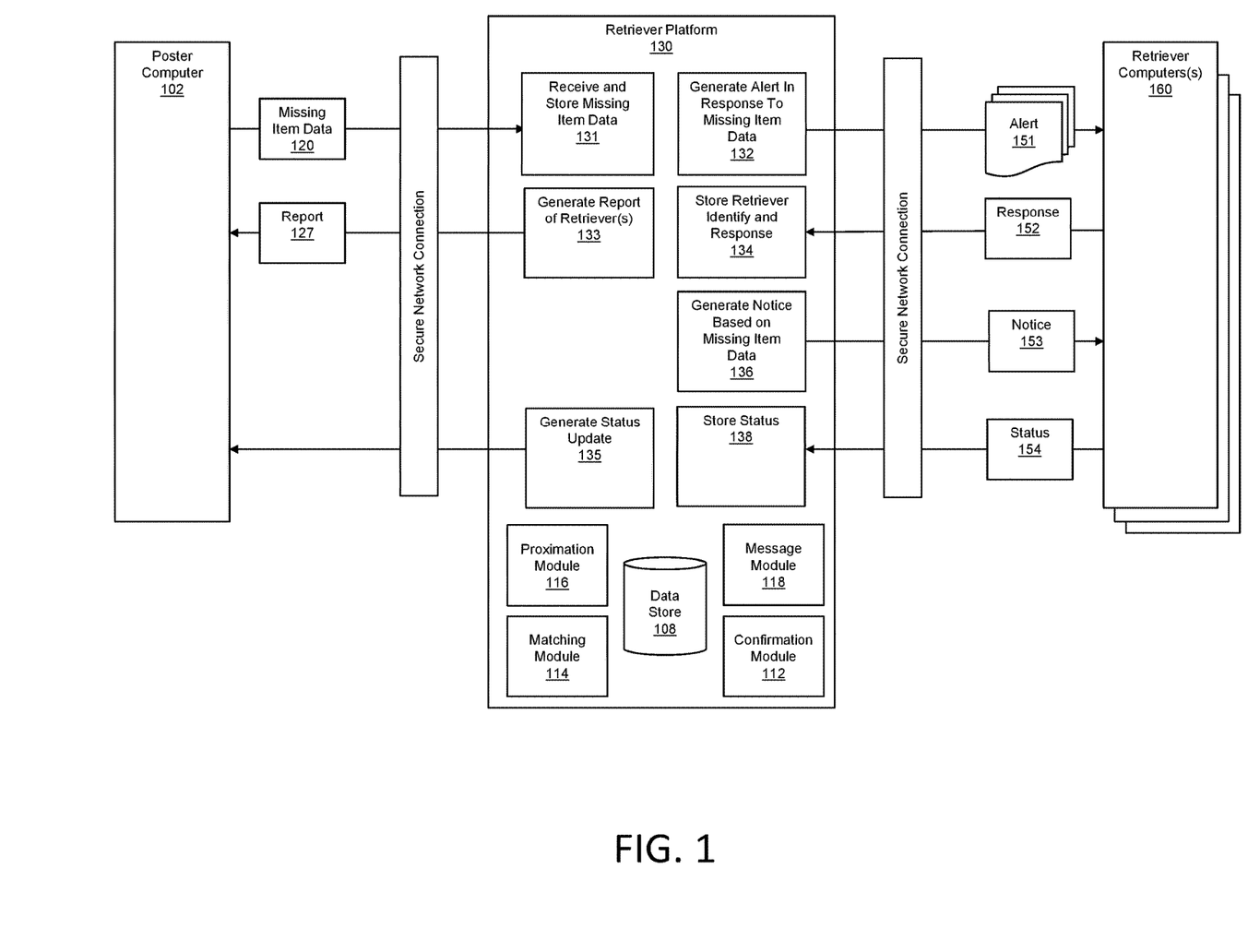
FIG. 1 depicts a system according to the present teachings.

Referring to FIG. 1, a system according to the present teachings may include a poster computer 102, a platform 130, and a retriever computer 160. A user may use the computers 102 or 160 to establish a secure network connection and log on to the platform 130. The computers may communicate with each other using various interfaces. The secure network connection may be accomplished by any number of means to access the functionality provided by the platform 130.

The poster computer 102 and the retriever computer 160 may be an electronic device as defined above. The platform 130 may be a computer or a server, may be offered as a service by a third-party to posters or retrievers, and may be provided by secure web pages, an application, or secure remote desktop connection that is executable on the poster computer 102 or the retriever computer 160.

The platform 130 may provide a data store 108 (or database(s)) for saving data. The data store 108 may be local, cloud-based or Internet-based. The platform 130 may include a message module 118 for generating alerts, reports, notices, status updates, etc. The platform 130 may include a confirmation module for confirming an assignment and associating the missing item data with a retriever's identity from an affirmative response of the retriever. The platform 130 may include a proximation module 116 for determining the proximation of the locations. The platform 130 may include a matching module 114 for matching the found items with existing flyers.

The platform 130 may include a number of additional modules, and such modules may provide additional functionality and may be part of the same software program or different software programs operating on different machines. For example, the message module 118 may include an alert module for generating an alert regarding missing item based on the received missing item data, and for send the alert to a retriever computer according to the retriever's setting or according to a determination made by the proximation module. The message module 118 may include a report module for generating a report regarding the accepted assignment and the retriever's identity or related information (e.g., performance history), and for sending the report to the poster computer. The message module 119 may include a notice module for generating a notice about the assignment upon a confirmation of an assignment, upon receiving an update in the message board regarding the assignment, or upon receiving a status update from other retriever computers, and for sending the notice to the retriever computer. The message module 119 may include a status module for generating a status update upon receiving any update regarding the assignment from the retriever computer, and for sending the status update to the corresponding poster computer.

A retriever may use the retriever computer 160 to establish a secure connection and log on to the platform 130. The retriever may create an account in the platform 130 to receive notification and information, such as alerts for nearby missing items, new assignments, report requests, but not limited thereto. When creating an account, the retriever may provide identity information to the platform 130 and may be automatically enrolled to receive all or some notifications and related information. Alternatively, without creating or logging in an account, the retriever may use the platform 130 as a guest to browse or receive limited information.

A poster may use the poster computer 102 to establish a secure connection and log on to the platform 130. The poster may create an account in the platform 130 to receive notification and information, such as information relating to the flyers the poster created, reports, assigning requests, status updates, although not limited thereto. Upon creation of an account, the poster may provide missing item data 120, such as a flyer for the missing item, to the platform 130. The platform 130 may save the data 131 in the data store 108. The flyer for the missing item may include information such as a description of the item, the last location seen, the reward, and the requirements for receiving the reward, although not limited thereto. The flyer may also include an image or images.

The platform 130 may generate, e.g., through a message module 118, an alert 132 in response to the data 131. The alert may contain limited information of the missing item and may be provided in different forms, for example, by including limited information of the missing item in a message or by providing a link to the website of the flyer page containing limited information of the missing item. The platform 130 may send the alert 151 to the retriever computer 160 according to the account setting of the retriever (i.e., the retriever may set the situation when the alert is sent in the retriever's account setting). For example, the platform 130 may send the alert 151 to the retriever computer 160 when the location set by the retriever is proximate to the location saved in the data 131, such as location of the missing item last seen. The location set by the retriever may be the location(s) the retriever is interested in or the location (s) of the retriever's address(es) in the retriever's account. As another example, the retriever platform 130 may send the alert 151 to the retriever computer 160 when detecting the retriever computer 160 is close to the location saved in the data 131, such as location of the missing item last seen. The detection of the location of the retriever computer 160 may require the location services provided in the retriever computer 160 to determine the approximate location of the retriever computer 160. The approximation of the locations may be determined based on zip codes, town or city names, the distance between Global Positioning System (GPS) locations, although not limited thereto.

For example, a poster who lost his wallet may input through the poster computer 102 the following information 120: the description of the missing item as "a black Tommy Hilfiger men's wallet including several credit cards, a driver's license card, twenty dollars, and a family picture"; the last location seen as "Dunkin' Donut Stamford downtown main street store or 450 Main St, Stamford, Conn. 06901", the reward as "fifty dollars", the requirements for receiving the reward as "meet and exchange in person; at least the credit cards and the driver's license card should be included", and an image of the wallet. The platform 130 receives and saves the information 131. The platform 130 generates an alert 132 with limited information as "a missing wallet near Stamford downtown, and a possible fifty dollars reward". When the platform 130 determines that there is a retriever's address registered in his account is Stamford, or has zip code 06901, or there is a retriever's interested locations set in his account include Stamford, or zip code 06901, or there is a retriever computer's current GPS location is within five miles (or other number of miles) from Stamford (e.g. city center or city limits) or from the area with zip code 06901, the platform sends the alert 151 with limited information to those retriever computers 160.

When the retriever reviews the alert 151 received in the retriever computer 160, the retriever may, immediately or later, respond as to whether to accept the task or assignment of finding the missing item. The retriever computer 160 may generate a response 152 and send it to the platform 130. The response may include retriever's identity or account information so that it is easy for the platform to identify the retriever.

Specifically, if the retriever responds as rejecting the assignment by checking a checkbox for decline or by pushing a button for decline, the retriever computer 160 may send the response 152 to the platform 130, and the platform 130 may save such rejection response in the data store 108. Such data may be used to analyze the retriever's preference, and the platform 130 may make recommendations or avoid sending notifications of similar assignments according to the retriever's preference.

If the retriever responds to accept the task by checking a checkbox for acceptance or by pushing a button for acceptance (i.e., an affirmative response), the retriever computer 160 may generate the response 152 and send it to the platform 130. The platform 130 may store the received response 134 in the data store 108, confirm, through a confirmation module 112, the assignment of finding the missing item according to the missing item data, and associate the assignment related files to the retriever identity or the retriever's account. The platform 130 may generate, through the message module 118, a report 133 regarding the assignment acceptance and send the report 127 to the poster computer 102. The report may include notification of the task acceptance and the information regarding the retriever.

Upon an affirmative response 152 is received, the platform 130 may allow the retriever to access the full information or information disclosing more detail regarding the task, for example, in a form of a link, and to access the message board regarding the task. The platform 130 may generate a notice 136 including full information of the missing item based on the missing item data, and send the notice 153 to the retriever computer 160. As the example of a missing wallet described above, the platform 130 generates a notice containing the following full information: the description of the missing item as "a black Tommy Hilfiger men's wallet including several credit cards, a driver's license card, twenty dollars, and a family picture"; the last location seen as "Dunkin' Donut Stamford downtown main street store or 450 Main St, Stamford, Conn. 06901", the reward as "fifty dollars", the requirements for receiving the reward as "meet and exchange in person; at least the credit cards and the driver's license card should be included", and an image of the wallet.

The platform 130 may also generate a notice regarding the assignment acceptance and send it to other retriever computers which have received the same alert 151 so that the other retrievers are aware of the situation, no matter whether the other retrievers are active on the task. The platform 130 may also generate a notice regarding the assignment acceptance and post it on the message board regarding the missing item.

The message board regarding the missing item may be accessible only by the retrievers who have accepted the assignment. The poster may set the accessibility to the message board regarding the missing item generally (i.e., all tasks posted by the poster), or specifically (i.e., regarding a specific task posted by the poster). However, limiting accessibility only to the retrievers who have accepted the assignment is preferred because such limitation will prevent thefts and make the communication and the task status more transparent.

Also, since the retriever computer 160 gets limited information of the missing item from the alert 151 but gets full information of the missing item from the notice 153, it reduces the possibility of that any unidentified retriever uses the full information to find the item but does not report or give back to the owner. A retriever who has given an affirmative response has a personal portfolio saved in the platform 130, and the personal portfolio may include identification information, home address, phone number, performance history, reviews (e.g., from a poster of his previous task, whether succeed or not), social credit information, but not limited thereto. A retriever providing such information may be considered as having been identified. Such identified retriever would more likely act as a credible retriever. The confirmation module 112 may verify the retriever identity that is associated the affirmative response, and associate the retriever identity with the missing item data.

The retriever searches for the missing item by utilizing information provided by the poster. The retriever is encouraged to share information regarding the search via the message board if such information can prevent an action repeated by multiple retrievers, for example, calling the same store. The platform 130 may generate, through the message module 118, a notice 136 about the missing item periodically, or upon receiving an update in the message board or receiving a status update from other retriever computers. The platform 130 may send the notice 153 to the retriever computer 160.

If the retriever finds the missing item, the retriever computer 160 may send status 154 as potentially successful finding of the missing item to the platform 130, and the platform 130 may update the status of the task accordingly and save the status 138 in the data store 108. The platform 130 may generate, through the message module 118, a status update 135 and send it to the poster computer 102.

The status 154 sent by the retriever computer 160 may contain contact information of the retriever that is provided by the retriever when generating the status 154. Alternatively, the status update 135 generated by the platform 130 (or the message module 118) may contain contact information of the retriever based on the contact information provided in the retriever's account.

The status 154 may further contain a picture(s) or descriptions of the item found by the retriever, so that it makes easier for the poster to determine whether the item found by the retriever is the item lost by the poster.

The poster may use the contact information provided above to contact the retriever. By contacting the retriever, the poster may further determine whether the item found by the retriever is the item requested by the poster, and if so, how to receive the item and provide the corresponding reward. For example, the poster may have a video chat or conference with the retriever to determine whether the item found by the retriever is the item requested by the poster or to check the condition of the item.

The poster and the retriever may agree to meet in person to exchange the item and the reward. Alternatively, the poster may send the reward through a payment method provided in the platform 130 and request the retriever to deliver the item by mail or in person. The payment method provided in the platform 130 may include credit or debit cards, PayPal, or escrow, although not limited thereto. Other payment methods that are not provided in the platform 130 may also be allowed. Whether the reward includes the delivering cost, the payment method, the delivering method, etc. may be pre-set by the poster in the flyer (i.e., missing item data 120) or in the poster's account.

Upon successful exchange of the item and the reward, the poster may send a message through the poster computer 102 to the platform 130, indicating that the item has been found, the message may be directly posted on the message board regarding the missing item, or may be saved in the platform 130 for further processing and notification. The platform 130 may inactivate the flyer (i.e., missing item data 120) and mark it as "found". The platform 130 may send a notice regarding the status update to other retriever computers which have received the alert 151.

If the item found by the retriever is not the item lost by the poster, the poster may update the status of the flyer as active and require continuation of finding, and the retriever who found the item that is not the item lost by the poster may post the information regarding the found item in the platform 130. The retriever posting features are illustrated with FIG. 3 in detail.

If a flyer is not claimed as "found" for a specific time of period, the platform 130 may send a request to the poster asking whether the flyer should be archived. If the poster does not respond for a certain time of period, the platform 130 may archive the poster automatically and inactivate the flyer. The poster may cancel or edit the flyer anytime.

Figure 2:
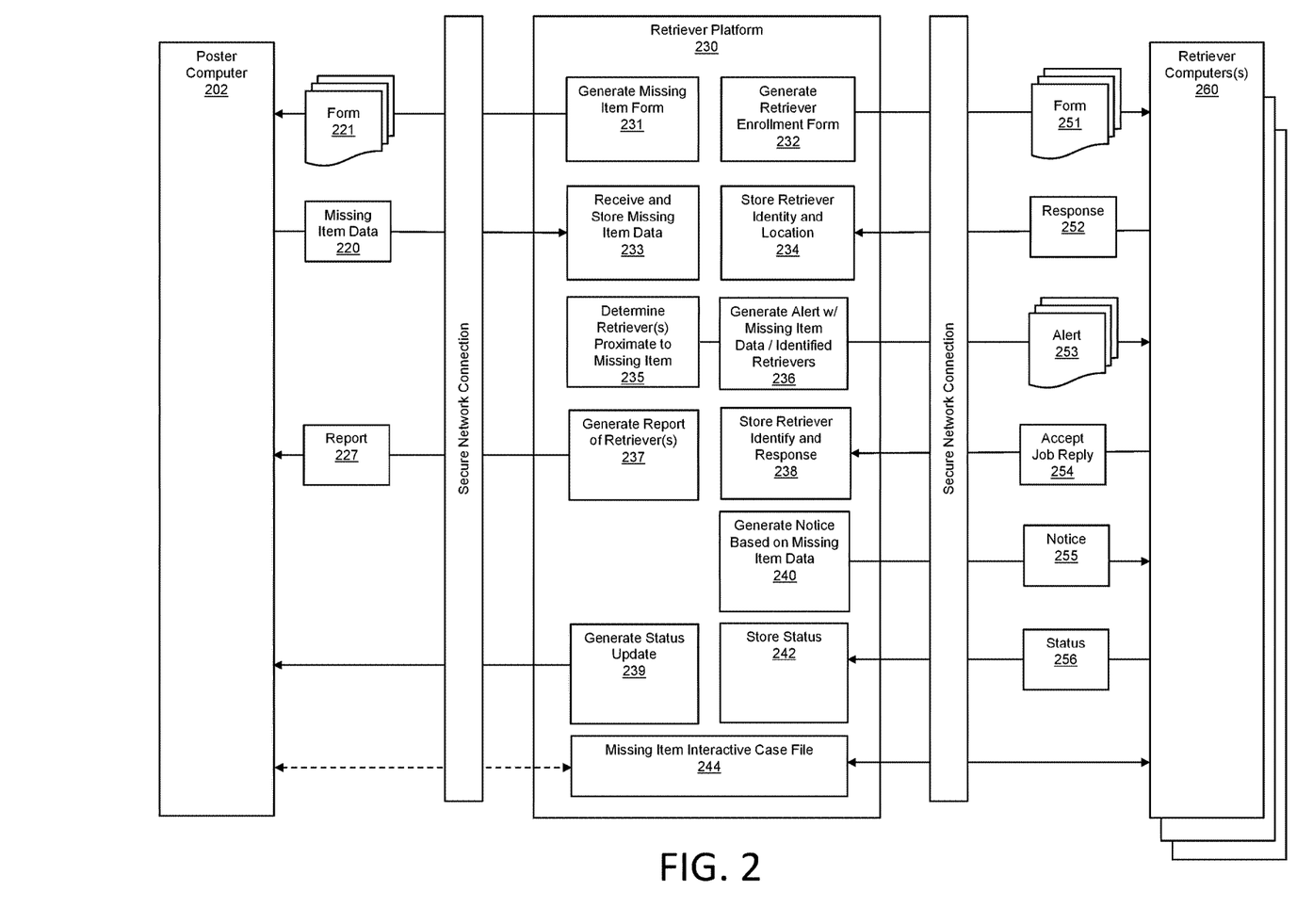
FIG. 2 depicts another system according to the present teachings.

Referring to FIG. 2, another system according to the present teachings may include a poster computer 202, a platform 230, and a retriever computer 260. A user may use the computers 202 or 260 to establish a secure network connection and log on to the platform 230. The computers may communicate with each other using various interfaces. The secure network connection may be accomplished by any number of means to access the functionality provided by the platform 230.

A retriever may use the retriever computer 160 to establish a secure connection and log on to the platform 130. When the retriever logs on to the platform 230, the platform 230 may ask the retriever that if he or she is a retriever (being interested in finding items) or a poster (having lost properties), and after the retriever responds as a retriever, the platform 230 may generate, through a form module (not shown), a retriever enrollment form 232, and send the form 251 to the retriever computer 260. The retriever may respond 252 to provide identity and location information (and other related information) by filing the retriever enrollment form, and the retriever computer 260 may send the response 252 to the platform 230. The platform 230 may save the information in the form such as retriever's identity and location in the date store or database. The retriever's location may be a location(s) that the retriever is interested in or a location(s) same as the retriever's address.

A poster may use the poster computer 202 to establish a secure connection and log on to the platform 230. When the poster logs on to the platform 230, the platform 230 may ask the poster that if he or she is a retriever (being interested in finding items) or a poster (having lost properties), and after the poster responds as a poster, the platform 230 may generate, through a form module (not shown), a missing item form 231 and send the form 221 to the poster computer 202. The poster may provide missing item data 220 by filling in the form 231. The poster computer 202 may send the missing item data 220 to the platform 230. The platform 230 may save the missing item data 233 in the data store or database. The missing item data may include information such as a description of the item, the location where the item was last seen, the possible location(s) where the item has gone missing, the reward, and the requirements for receiving the reward, although not limited thereto. The missing item data may also include an image or images.

The platform 230 may determine 235, through a proximation module (see 116 in FIG. 1), whether the retriever's location 234 saved in the database is proximate to the location of the missing item 233 saved in the database, which may include the location last seen and the possible location(s) of gone missing. The proximation of locations may be determined based on zip codes, town or city names, the distance between GPS locations, although not limited thereto. If the platform 230 determine that there is a proximation of any locations described above, the platform 230 may generate, through a message module (see 118 in FIG. 1), an alert 236 with missing item data for the determined proximate retriever. The alert may include limited information of the missing item in a message or may provide a link to the website of the flyer page containing limited information of the missing item. The platform 230 may send the alert 253 to the retriever computer 260.

When the retriever reviews the alert 253 received in the retriever computer 260, the retriever may, immediately or later, respond as to whether to accept the task or assignment of finding the missing item. Specifically, if the retriever responds as rejecting the task by checking a checkbox for decline or by pushing a button for decline, the retriever computer 260 may generate a response and send the response to the platform 230. The response may include retriever's identity information and missing item data information. The platform 230 may save such rejection response in the data store for statistical analysis.

If the retriever responds as accepting the assignment by checking a checkbox for acceptance or by pushing a button for acceptance, the retriever computer 260 may generate an affirmative response 254 and send it to the platform 230. The platform 230 may store the received response 238 and link the task-related files to the retriever's identity. The platform 230 may generate, through a message module (see 118 in FIG. 1), a report 237 regarding the assignment acceptance and the retriever, and send the report 227 to the poster computer 202. The report may include notification of the task acceptance and the information regarding the retriever. Upon an affirmative response 254 is received, the platform 230 may allow the retriever to access the full information regarding the task and to access the message board regarding the task. The platform 230 may generate a notice 236 including full information of the missing item based on the missing item data and send the notice 255 to the retriever computer 260. By distinguishing sending an alert with limited information and sending a notice with full information, it protects the poster's interest to keep possible thefts away as explained above.

The platform 230 may generate a notice regarding the assignment acceptance and send it to other retriever computers which have received the same alert 253 so that the other retrievers are aware of the situation, no matter whether the other retrievers are active on the task. The platform 230 may generate a notice regarding the task acceptance and post it on the message board regarding the missing item in the platform 230.

The message board regarding the missing item may be accessible only by the retrievers who has accepted the task. The poster may set the accessibility to the message board regarding all tasks posted by the poster, or regarding a specific task posted by the poster.

The retriever searches for the missing item by utilizing information provided by the poster. The retriever is encouraged to share information regarding the search via the message board if such information can prevent an action repeated by multiple retrievers, for example, calling the same store. The platform 230 may generate a notice 240 about the task periodically, or upon receiving an update in the message board or receiving a status update from other retriever computers. The platform 230 may send the notice 255 to the retriever computer 260.

If the retriever finds the missing item, the retriever computer 260 may send status 256 as potentially successful finding of the missing item to the platform 230, and the platform 230 may update the status of the task accordingly and save the status 242 in the database. The platform 230 may generate, through a message module (see 118 in FIG. 1), a status update 239 and send it to the poster computer 202.

The status 256 sent by the retriever computer 260 may contain contact information of the retriever that is provided by the retriever when generating the status 256. Alternatively, the status update 239 generated by the platform 230 may contain contact information of the retriever based on the contact information provided in the retriever's response 252 when filing in the form 251. The status 256 may further contain a picture(s) or descriptions of the item found by the retriever, so that it makes easier for the poster to determine whether the item found by the retriever is the item requested by the poster.

Upon successful exchange of the item and the reward, the poster may send a message through the poster computer 202 to the platform 230, indicating that the item has been found, the message may be directly posted on the message board regarding the task, or may be saved in the platform 230 for further processing and notification. The platform 230 may inactivate the missing item data 220 and mark it as "found".

The platform 230 may send a notice about such status update to other retriever computers which have received the alert 253.

If the item found by the retriever is not the item lost by the poster, the poster may update the status of the flyer as active and require continuation of finding, and the retriever who found the item that is not the item lost by the poster may post the information regarding the found item in the platform 230. The retriever posting features are illustrated with FIG. 3 in detail.

If missing item data 220 is not marked as "found" for a specific time of period, the platform 230 may send a request to the poster asking whether the flyer should be archived. If the poster does not respond for a certain time of period, the platform 230 may archive the poster automatically and inactivate the flyer. The poster may cancel or edit the missing item data anytime.

The platform 230 may save the interactive case file 244 that shows the active assignments for the retriever, and the retriever computer 260 may access to these files.

Figure 3:
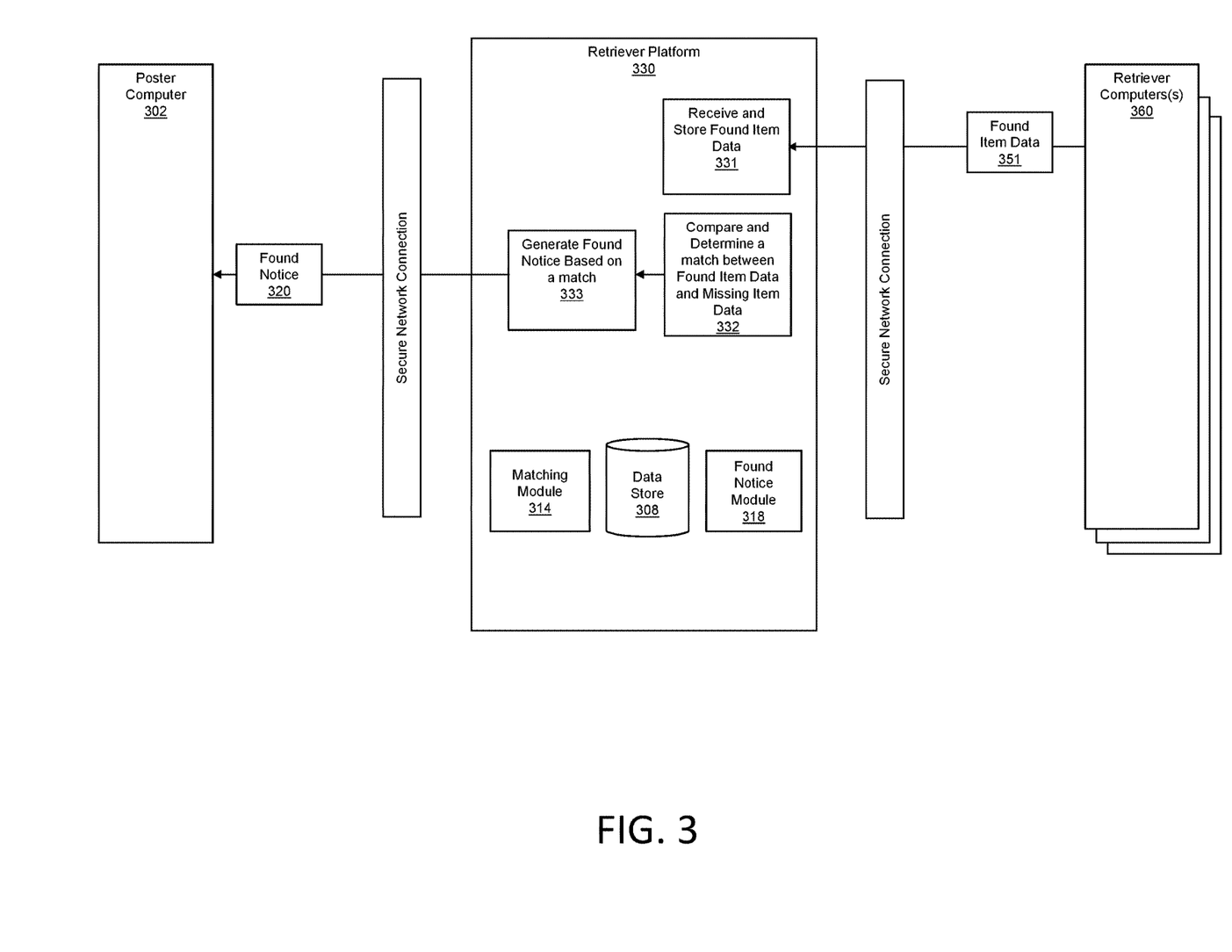
FIG. 3 depicts a system with a retriever's posting feature according to the present teachings.

Referring now to FIG. 3, shown is a system with a retriever posting feature according to the present teachings. The system according to the present teachings may include a poster computer 302, a platform 330, and a retriever computer 360. A user may use the computers 302 or 360 to establish a secure network connection and log on to the platform 330. The computers may communicate with each other using various interfaces. The secure network connection may be accomplished by any number of means to access the functionality provided by the platform 330.

The retriever may find an item randomly, find an item during the search for other tasks, or find an item during the search for the current task but the item is determined as not the item requested by the poster. The retriever may provide the information of the found item (i.e., found item data) by creating a flyer or by filling a form generated by the platform 330. The platform 330 may send the found item data 351 to the platform 330. The platform 330 may save the found item data 331 in the data store 308. The platform 330 may, through a matching module 314, compare the found item data with the missing item data (e.g., missing item flyer or missing item form) that have been saved in the data store 308 and determine whether there is a match 332 between a found item and a missing item. The missing item data may include currently active flyers (or forms) or old flyers (or forms) that have been inactivated but not marked as "found". If it is determined that there is a match, the platform 130 may generate, through a message module (see 118 in FIG. 1) or a found notice module 318, a notice of the match 333 and send the found notice 320 to the poster of the matched flyer through the poster computer 302. The poster of the matched flyer may review the information regarding the found item and determine whether the found item is the item requested by the poster.

The found item data 351 sent by the retriever computer 160 may contain contact information of the retriever that is provided by the retriever when generating the status 154. Alternatively, the notice 333 generated by the platform 330 may contain contact information of the retriever based on the contact information provided in the retriever's account. The found item data 351 may further contain a picture(s) or descriptions of the item found by the retriever, so that it makes easier for the poster to determine whether the item found by the retriever is the item lost by the poster.

Upon successful exchange of the item and the reward, the poster may send a message through the poster computer 302 to the platform 330, indicating that the item has been found, the message may be directly posted on the message board regarding the task, or may be saved in the platform 330 for further processing and notification. The platform 330 may inactivate the missing item data (e.g., flyer or missing item form) and mark it as "found". The platform 330 may send a notice about such status update to other retriever computers which have received an alert regarding this task.

If the item found by the retriever is not the item lost by the poster, the platform 330 may keep the status of the missing item data as it is, and platform 330 may archive the found item data for a future match. For example, if any new missing item data is input and saved in the data store 308, the platform may compare the new missing item data with the found item data and determine whether there is a match. The retriever may cancel or edit the found item data anytime.

Figure 4:
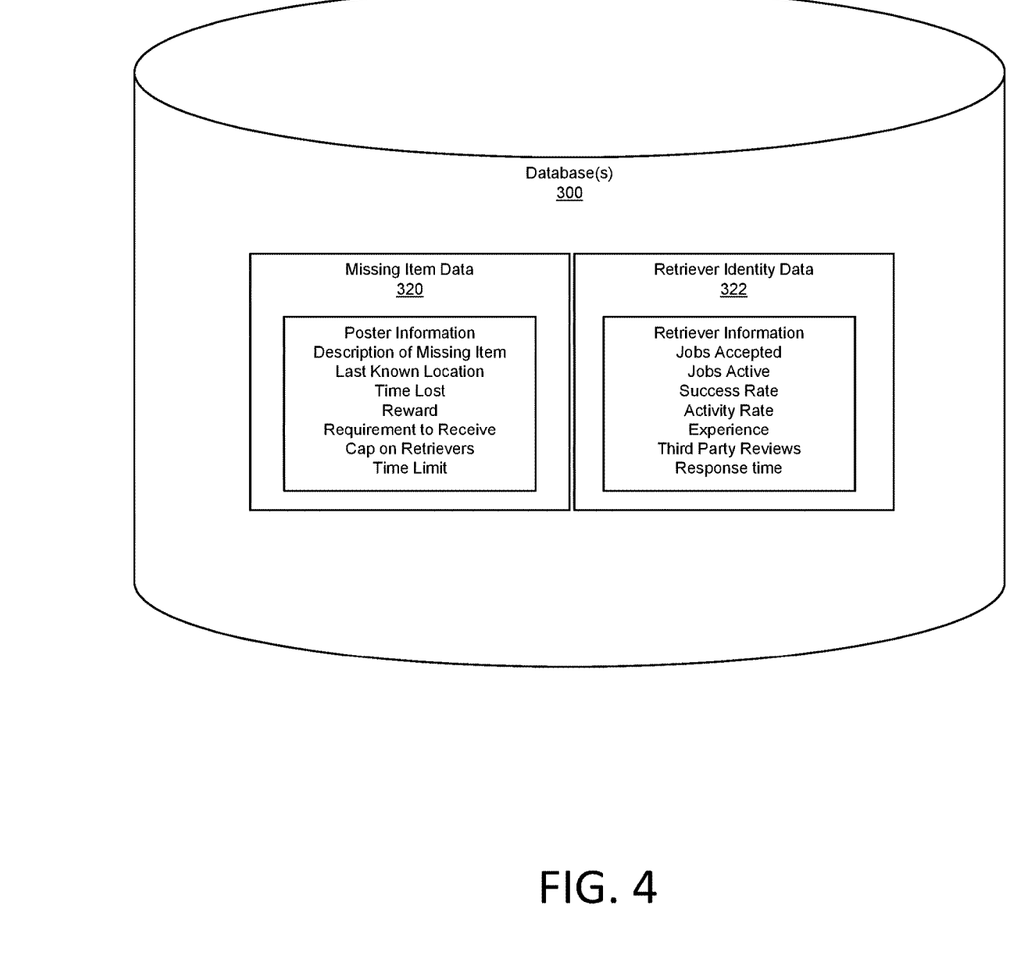
FIG. 4 depicts a data store of the system according to FIG. 1.

Referring now to FIG. 4, shown is a data store of the system according to FIG. 1. One or more data stores may have portions that are only accessible to certain users. The database 300 may have databases with information on missing item data 320, and retriever identity data 322, although not limited thereto. The missing item data 320 may include poster information, description of missing item, last known location, time lost, reward, requirement to receive, cap on retrievers, time limit, although not limited thereto. The retriever identity data 322 may include the retriever information, jobs accepted, active jobs, success rate, activity rate, experience, third party reviews, response time, total reward amounts accepted, or number of jobs that had been done for no money—a good Samaritan reward, although not limited thereto.

Although the present teachings use the missing item as an example, other item that is requested by a poster, but not necessary as a missing item, is also covered by the present teachings.

While the present teachings have been described above in terms of specific embodiments, it is to be under stood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for assignment and publication of missing item data, comprising:
 a server;
 a poster computer associated with a poster, the poster being an individual seeking a missing item;
 a first secure connection over the Internet between the server and the poster computer, the first secure connection requiring authentication of the poster;
 a plurality of retriever computers, each retriever computer associated with a retriever, the retriever being an individual interested in finding items;
 a plurality of second secure connections over the Internet, one between each retriever computer and the server, each second secure connection requiring authentication of the associated retriever;
 a data store accessible by the server;
 the data store having a missing item database having a plurality of records each having missing item data associated therewith;
 the data store having a retriever database having a plurality of records each having retriever identity associated therewith;
 an interface on the server for receiving missing item data from the poster computer via the first secure connection, the missing item data comprising a description of a missing item and a last known location of the missing item;
 an alert module comprising a non-transient computer readable medium containing software executed by at least one processor on the server for generating an alert in response to the missing item data and sending the alert to a plurality of the retriever computers via the second secure connection, wherein the alert includes general information regarding a missing item including one or more of a general description of the missing item and a general identification of the last known location of the missing item, and wherein the alert excludes specific information regarding the missing item including one or more of a specific description of the missing item and a specific identification of the last known location of the missing item;
 the interface on the server for receiving an affirmative response to the alert from at least one of a plurality of the retriever computers via the second secure connection, the affirmative response associated with retriever identity of a retriever who gave the affirmative response through the at least one of a plurality of the retriever computers;
 a confirmation module comprising a non-transient computer readable medium containing software executed by at least one processor on the server for confirming an assignment of the missing item upon receiving the affirmative response to the alert and associating the missing item data of the assignment with the retriever identity; and
 a notice module comprising a non-transient computer readable medium containing software executed by at least one processor on the server for generating a notice based on the missing item data and sending the notice to the at least one of a plurality of the retriever computers that affirmatively responded to the alert via the second secure connection, wherein the notice includes the specific information regarding the missing item including one or more of the specific description of the missing item and the specific identification of the last known location of the missing item, thereby enabling the retriever that affirmatively responded to the alert to begin searching for the missing item based on the specific information included in the notice.

2. The system of claim 1 further comprising a status module comprising a non-transient computer readable medium containing software executed by at least one processor on the server for generating a status update upon receiving status information from a retriever via the interface and sending the status update to the poster computer.

3. The system of claim 2, wherein the status update includes contact information of the retriever.

4. The system of claim 1 further comprising a report module comprising a non-transient computer readable medium containing software executed by at least one processor on the server for generating a report that confirms the assignment of the missing item upon receiving the affirmative response and associating the missing item data of the assignment with the retriever identity and for sending the report to the poster computer.

5. The system of claim 4, wherein the retriever information includes the retriever identity, at least one location, or performance history.

6. The system of claim 1 further comprising a proximation module comprising a non-transient computer readable medium containing software executed by at least one processor for determining whether a location of a retriever is proximate to a location provided in the missing item data.

7. The system of claim 6, wherein the location of the retriever includes a location of the retriever computer, a location of the retriever's address, or a location interested by the retriever, and wherein the location provided in the missing item data includes a location of the missing item last seen, or a location of the missing item possibly gone missing.

8. The system of claim 6 determining whether a location of a retriever is proximate to a location provided in the missing item data is based on zip codes, town or city names, or distance between Global Positioning System (GPS) locations.

9. The system of claim 1 further comprising a matching module comprising a non-transient computer readable medium containing software executed by at least one processor on the server for comparing found item data received from a retriever computer via the interface with missing item data and determining whether there is a match between the found item data and the missing item data.

10. The system of claim 9 further comprising a found notice module comprising a non-transient computer readable medium containing software executed by at least one processor for generating a found notice based on the match between the found item data and the missing item data and sending the found notice to the poster computer.

11. The system of claim 1, wherein a triggering condition for sending the alert is set by the retriever.

12. The system of claim 6, wherein sending the alert to a retriever computer is triggered when the proximation module determines that a location of the retriever is proximate to a location provided in the missing item data, wherein the location of the retriever computer includes a location of the retriever computer, a location of the retriever's address, or a location interested by the retriever, and wherein the location provided in the missing item data includes a location of the missing item last seen, or a location of the missing item possibly gone missing.

13. The system of claim 1 further comprising a form module comprising a non-transient computer readable medium containing software executed by at least one processor for generating a missing item form that can be filled in by the poster to provide the missing item data, generating a retriever enrollment form that can be filled in by the retriever to provide the retriever identity or related information, and sending the forms to corresponding poster or retriever computers.

14. The system of claim 1 wherein the missing item data includes a description of the missing item, a location of the missing item last seen, at least one location of the missing item possibly gone missing, a reward for exchanging the missing item, a requirement for receiving the reward, a delivering method, a payment method, who pays for a delivering cost, whether the reward includes the delivering cost, or at least one picture.

15. The system of claim 1, wherein the retriever identify includes identification information, address, phone number, performance history, review, or social credit information.

16. A system for assignment and publication of missing item data, comprising:
a server;
a poster computer for inputting missing item data;
at least one retriever computer for inputting retriever identity data;
a data store accessible by the server;
the data store having a missing item database having a plurality of records each having missing item data associated therewith;
the data store having a retriever database having a plurality of records each having retriever identity data associated therewith;
an interface on the server for receiving the missing item data from the poster computer;
an alert module comprising a non-transient computer readable medium containing software executed by at least one processor on the server for generating an alert in response to the missing item data and sending the alert to the at least one retriever computer, wherein the alert includes general information regarding a missing item including one or more of a general description of the missing item and a general identification of the last known location of the missing item, and wherein the alert excludes specific information regarding the missing item including one or more of a specific description of the missing item and a specific identification of the last known location of the missing item;
the interface on the server for receiving an affirmative response to the alert from the at least one retriever computer, the affirmative response being associated with the retriever identity data; and
a confirmation module comprising a non-transient computer readable medium containing software executed by at least one processor on the server verifying retriever identity based on the retriever identity data associated with the affirmative response to the alert and associating the missing item data with the retriever identity data;
a notice module comprising a non-transient computer readable medium containing software executed by at least one processor on the server for generating a notice based on the missing item data and sending the notice to the at least one of a plurality of the retriever computers that affirmatively responded to the alert via the second secure connection, wherein the notice includes the specific information regarding the missing item including one or more of the specific description of the missing item and the specific identification of the last known location of the missing item, thereby enabling a retriever that affirmatively responded to the alert to begin searching for the missing item based on the specific information included in the notice.

17. A non-transient computer readable medium containing software executed by at least one processor for causing a central computer to perform the following steps:
storing a missing item database having a plurality of records each having missing item data associated therewith;
storing a retriever database having a plurality of records each having retriever identity associated therewith;
receiving missing item data from a poster computer via a first secure connection;
generating an alert in response to the missing item data and sending the alert to a plurality of retriever computers via a second secure connection, wherein the alert includes general information regarding a missing item including one or more of a general description of the missing item and a general identification of the last known location of the missing item, and wherein the alert excludes specific information regarding the missing item including one or more of a specific description of the missing item and a specific identification of the last known location of the missing item;

receiving an affirmative response to the alert from at least one of a plurality of the retriever computers via the second secure connection, the affirmative response associated with retriever identity;

confirming an assignment upon receiving the affirmative response to the alert and associating the missing item data with the retriever identity data;

associating the missing item data of the assignment with the retriever identity; and generating a notice based on the missing item data and sending the notice to the at least one of a plurality of the retriever computers that affirmatively responded to the alert via the second secure connection, wherein the notice includes the specific information regarding the missing item including one or more of the specific description of the missing item and the specific identification of the last known location of the missing item, thereby enabling the retriever that affirmatively responded to the alert to begin searching for the missing item based on the specific information included in the notice.

* * * * *